United States Patent
Gierlich et al.

(10) Patent No.: US 8,742,978 B2
(45) Date of Patent: Jun. 3, 2014

(54) METHOD AND ARRANGEMENT FOR MEASURING DELAY OF A SIGNAL BETWEEN TWO STATIONS OF THE ARRANGEMENT

(75) Inventors: Roland Gierlich, Rheinbach (DE); Jörg Hüttner, München (DE); Andreas Ziroff, Passau (DE)

(73) Assignee: Siemens Aktiengesellschaft, Munich (DE)

( * ) Notice: Subject to any disclaimer, the term of this patent is extended or adjusted under 35 U.S.C. 154(b) by 286 days.

(21) Appl. No.: 13/390,077

(22) PCT Filed: Jul. 13, 2010

(86) PCT No.: PCT/EP2010/060014
§ 371 (c)(1),
(2), (4) Date: Feb. 10, 2012

(87) PCT Pub. No.: WO2011/018286
PCT Pub. Date: Feb. 17, 2011

(65) Prior Publication Data
US 2012/0147940 A1   Jun. 14, 2012

(30) Foreign Application Priority Data
Aug. 11, 2009 (DE) .......................... 10 2009 036 937

(51) Int. Cl.
*G01S 13/12* (2006.01)
*G01S 13/10* (2006.01)
*G01S 13/22* (2006.01)

(52) U.S. Cl.
CPC *G01S 13/10* (2013.01); *G01S 13/22* (2013.01)
USPC .............................. 342/125; 342/137; 342/145

(58) Field of Classification Search
CPC ....... G01S 13/767; G01S 13/22; G01S 13/10; G01S 13/106; G01S 13/24; G01S 13/765; G01S 7/2923
USPC .......................... 342/125–127, 137, 145, 189
See application file for complete search history.

(56) References Cited

U.S. PATENT DOCUMENTS 4,106,019 A * 8/1978 Alexander et al. ............ 342/108
4,628,312 A * 12/1986 Hwang et al. .............. 340/12.17

(Continued)

FOREIGN PATENT DOCUMENTS

DE   102008025244 A1 * 12/2009
EP     0 676 650        10/1995

(Continued)

*Primary Examiner* — John B Sotomayor
(74) *Attorney, Agent, or Firm* — Cozen O'Connor

(57) ABSTRACT

A method and an arrangement for determining the delay of a signal between a first station and a second station of the arrangement, with the aim of determining the spatial distance between the stations. A first series of first signal pulses is generated in the first station at a first pulse repetition rate f1. A second and a third series of second and third signal pulses is generated in the second station, comprising a second f2 and third pulse repetition rate f3, where f2=f1+Δf and f3=f1−Δf. The second and third series of second and third signal pulses are transmitted to the first station, where the series are correlated with the first series of first signal pulses. The delay of the signal can be determined from the time elapsed between two successive pulses of the signal arising from the correlation.

17 Claims, 6 Drawing Sheets

(56) References Cited

U.S. PATENT DOCUMENTS

| | | | |
|---|---|---|---|
| 4,847,622 A * | 7/1989 | Maitre et al. | 342/110 |
| 6,639,546 B1 * | 10/2003 | Ott et al. | 342/129 |
| 2008/0106461 A1 | 5/2008 | Lee et al. | |
| 2009/0212997 A1 * | 8/2009 | Michalski | 342/137 |

FOREIGN PATENT DOCUMENTS

| | | |
|---|---|---|
| EP | 2465310 B1 * | 12/2013 |
| WO | WO 99/61936 | 12/1999 |
| WO | WO 2004/035357 | 4/2004 |
| WO | WO 2011018286 A1 * | 2/2011 |

\* cited by examiner

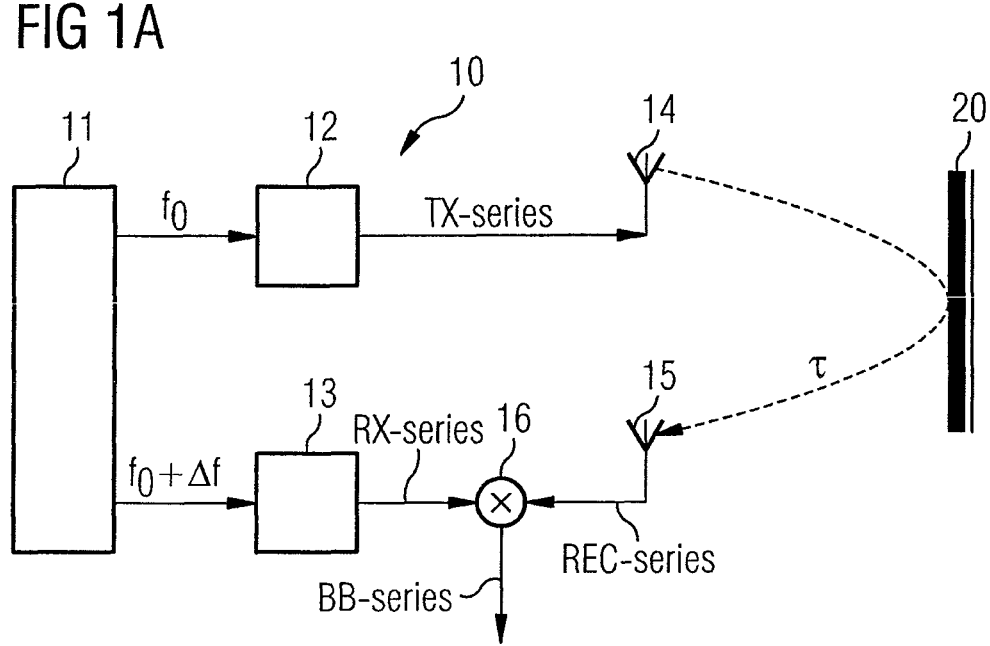

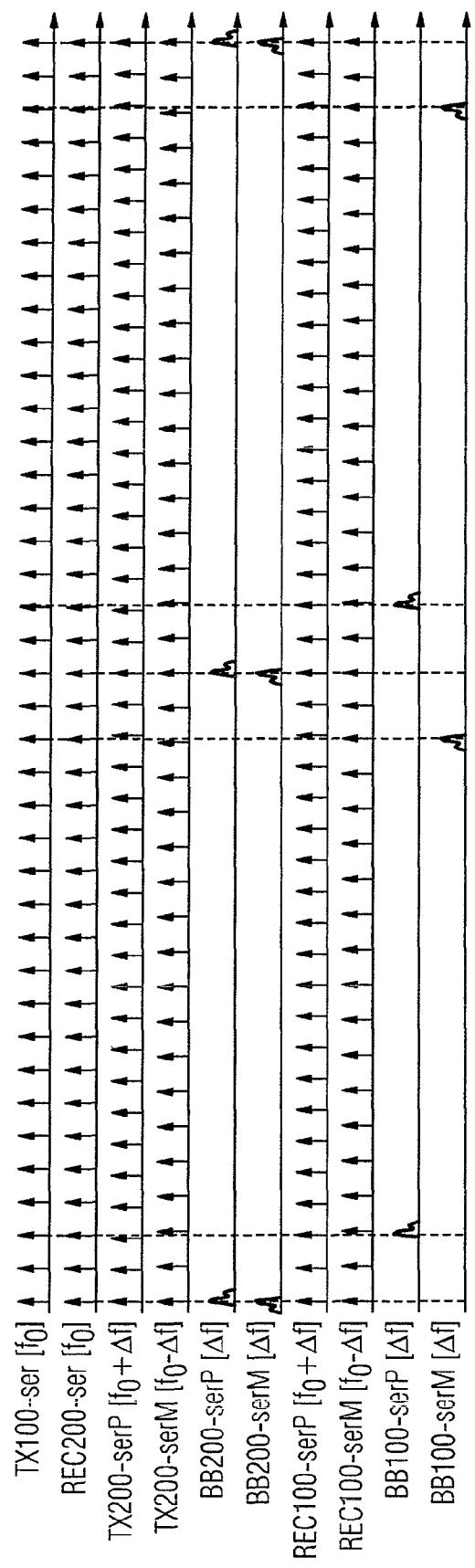

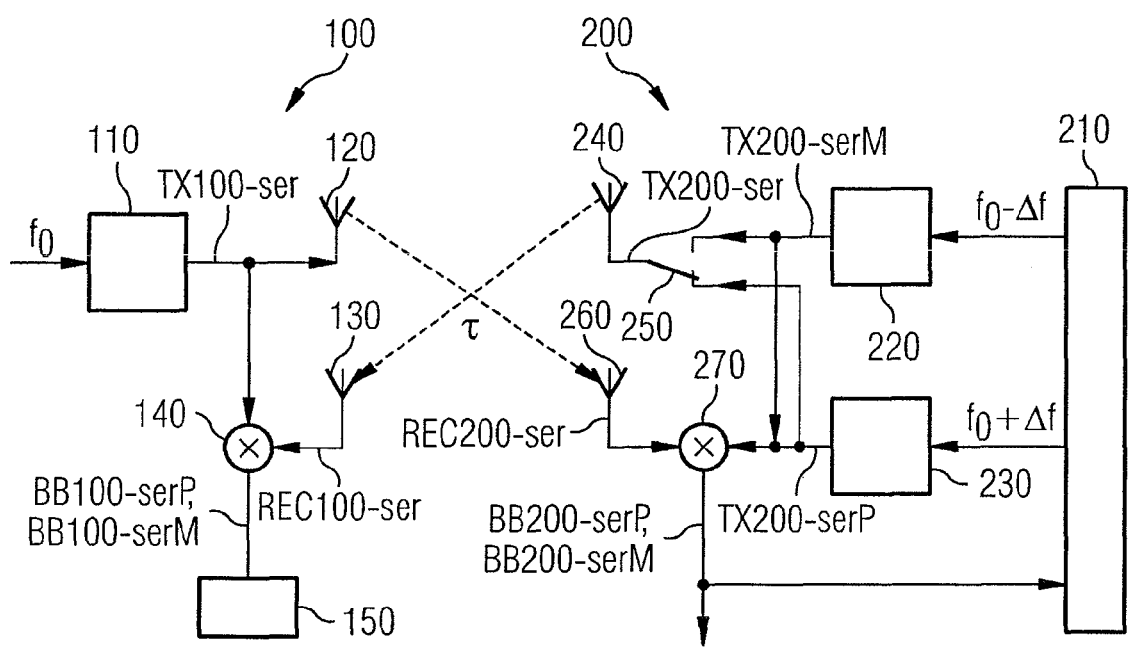

METHOD AND ARRANGEMENT FOR MEASURING DELAY OF A SIGNAL BETWEEN TWO STATIONS OF THE ARRANGEMENT

CROSS-REFERENCE TO RELATED APPLICATIONS

This is a U.S. national stage of application No. PCT/EP2010/060014 filed 13 Jul. 2010. Priority is claimed on German Application No. 10 2009 036 937.6 filed 11 Aug. 2009, the content of which is incorporated herein by reference in its entirety.

BACKGROUND OF THE INVENTION

1. Field of the Invention

The invention relates to communication signal processing and, more particularly, to a method and an arrangement for determining the propagation delay of a signal between a first and second station in the arrangement with to determine the spatial distance between the stations.

2. Description of the Related Art

The industrial domain is an instance of where precisely determining a radio transmitter's position or, as the case may be, its distance from a base station or such is of significance. Besides meeting the demand for cost- and energy-saving measuring systems, particularly for applications in closed spaces or halls it is therein necessary owing to possible multipath reflections to employ high-resolution measuring systems to obviate errors in distance measuring. For instance, Ultra Wide Band (UWB) signals offer a large signal bandwidth and thereby promise a relatively high resolution and high degree of accuracy.

Various methods that employ, for example, optical signals, ultrasound signals, or radio sensor technology, are known for determining a position or, as the case may be, distance. In particular, the methods for determining a distance bistatically with the aid of radio signals can be divided into three categories.

The first category is communication-based systems. Here, the distance is determined additionally from the communication signal. The degrees of accuracy achievable in distance measurements are not expected to be high because less stringent demands are placed on synchronizing in many communication systems or, as the case may be, only a very narrow-band radio channel is available.

The second category is Frequency Modulated Continuous Frequency-Stepped Continuous Wave (FMCW/FSCW) solutions. These systems operate in the Industrial, Scientific, and Medical (ISM) bands and enable a distance value to be determined in a manner similar to classical FMCW radar by tuning a transmitting frequency. Transponder-based or, as the case may be, backscatter solutions are therein employed on the one hand and, on the other, receivers that can synchronize themselves therewith.

The third category is ultra wideband (UWB) systems. These systems exploit new regulations allowing the emission of ultra wideband signals which, though, have a very low spectral power density. The receiver architectures can be, for example, power detectors having a moderate capacity or coherent receivers that require either very long correlation times or an extremely fast sampling rate.

These solutions have cost implications specifically for one-dimensional distance measuring between two radio stations because complex signal-processing steps are necessary in at least one of the two stations.

FIG. 1A shows a conventional principle of measuring distance between a transmitting/receiving station 10 and an object 20. Transmitting/receiving station 10 has a phase-locked loop (PLL) 11 that drives a first 12 and second pulse generator 13. First pulse generator 12 thereupon generates a first series TX-series of signal pulses TX-puls(i), where i=0, 1, 2, 3, . . . , at a pulse-repetition rate $f_0$. Second pulse generator 13 correspondingly generates a second series RX-series of signal pulses RX-puls(j), where j=0, 1, 2, 3, . . . , at a pulse-repetition rate $f_0 + \Delta f$. It can therein be assumed that, for example, signal pulses TX-puls(0) and RX-puls(0) are generated simultaneously.

Because pulse-repetition rates differ by the amount $\Delta f$, signal pulses of first series TX-series and second series RX-series regularly coincide at time intervals $1/\Delta f$, meaning at instants $T_{TX/RX}(a) = a*1/\Delta f + c$, where a=0, 1, 2, 3 . . . c is therein only a constant that depends on how instant t=0 is established (for example c=0 in the case of FIG. 1B).

First series TX-series is then emitted by an antenna 14 of transmitting/receiving station 10 and reflected on object 20 whose distance from transmitting/receiving station 10 is to be ascertained.

First series TX-series or, as the case may be, its signal pulses TX-puls(i) is/are reflected on object 20 and received by a second antenna 15 of transmitting/receiving station 10. Another series REC-series of signal pulses REC-puls(i) which, like first series TX-series, has a pulse-repetition rate $f_0$, but which is time-shifted relative to series TX-series in keeping with signal propagation delay $\tau$, will thus be available at antenna 15. Signal propagation delay $\tau$ is therein defined such that $\tau$ indicates the length of time a signal takes to travel from transmitting/receiving station 10 to object 20 and back. Received series REC-series has accordingly been shifted by $\tau$ relative to transmitted series TX-series.

Receive signal RX-series having pulse-repetition rate $f_0$ is fed to a mixer 16 in which it is correlated with second series RX-series of signal pulses RX-puls(j) at a pulse-repetition rate $f_0 + \Delta f$. The signal will be detectable in the baseband if the two series' signal pulses coincide, meaning that a series BB-series having signal pulses BB-puls(k) and then having in each case a signal pulse BB-puls(k) will be generated in mixer 16 if a signal pulse RX-puls(j) of RX-series coincides in time with a signal pulse REC-puls(i) of REC-series. That occurs at instants $T_{REC/RX}(b) = b*1/\Delta f - \tau*f0/\Delta f + c$, where b=0, 1, 2, 3, . . . and c=constant (see above).

The time distance $\Delta$ between an instant $T_{TX/RX}(a)$ at which two pulses of series TX-series and RX-series coincide in time and an instant $T_{REC/TX}(b)$ at which two pulses of series of REC-series and RX-series coincide in time, $\Delta = \tau*f0/\Delta f$, will then with a=b be proportional to propagation delay $\tau$ and hence also to the distance between transmitting/receiving station 10 and object 20.

FIG. 1B shows the time characteristics of the different pulse series TX-series, RX-series, RX-series, and BB-series. Signal pulses TX-puls(0) and RX-puls(0) were generated simultaneously. Receive signal REC-series has been time-shifted relative to first pulse series TX-series due to propagation delay $\tau$. The result BB-series for series REC-series and RX-series correlating that occur in mixer 16 is shown at the bottom of the chart. Comparing instant $T_{REC/RX}(1)$ with $T_{TX/RX}(1)$ will supply signal propagation delay $\tau$. It should be appreciated that the same applies to comparing instants $T_{REC/RX}(2)$ with $T_{TX/RX}(2)$, etc., meaning that comparing instants $T_{REC/RX}(a)$ with $T_{TX/RX}(a)$ will supply the propagation delay being sought.

The conventional method that is presented assumes, however, that the transmitter and receiver are accommodated in one and the same station or, as the case may be, that a common time scale for the different signal series is established by PLL 11, meaning that the transmitter and receiver are synchronized. Only the distance from an object can accordingly be measured with this method, not the distance between two stations. If the transmitter and receiver are mutually separate and not fed by a shared PLL, for example, synchronizing will first need to be established for measuring the distance between the transmitter and receiver.

SUMMARY OF THE INVENTION

It is therefore the object of the present invention to provide a method and an arrangement for determining the propagation delay of a signal between a first and second station.

This and other objects and advantages are achieved in accordance with the invention by providing the possibility to synchronize UWB pulses which thus enables the distance between two stations to be determined.

In accordance with the invention, a first series TX100-ser of first signal pulses is first generated in a first station at a first pulse-repetition rate f1 to determine the signal propagation delay τ between the first station and the second station. Generated thereupon in the second station are a second series TX200-serP of second signal pulses at a second pulse-repetition rate f2 and a third series TX200-serM of third signal pulses at a third pulse-repetition rate f3, with f2=f1+Δf and f3=f1−Δf applying to the pulse-repetition rates in the second station. Second series TX200-serP and third series TX200-serM are then transmitted by the second station to the first station and received there, whereupon series REC100-serP, REC100-serM received at the first station will be fed to a correlator, in particular a mixer. The series will be correlated there with the first series, with a resultant series BB100-ser of signal pulses being generated. Signal propagation delay τ is finally determined from the time distance Δ between two successive signal pulses of resulting series BB100-ser.

A signal pulse of resulting series BB100-ser will be generated in the correlator whenever a signal pulse of first series TX100-ser coincides in time with a signal pulse of received series REC100-serP, REC100-serM.

The second and third series are advantageously first mutually superimposed to form a further series particularly by adding the second and third series. The second and third series are then transmitted to the first station as the further series and received there.

In an alternative embodiment, before being transmitted to the first station, the second and third series are fed to a switch belonging to the second station, with the switch being controlled to alternately select the second or third series, with the selected series being transmitted to the first station and received there.

The switch is driven to change over at the instant in time at which the second-series and third-series pulses are generated simultaneously.

Second series TX200-serP and third series TX200-serM are advantageously generated having a fixed mutual phase relationship.

Second pulse-repetition rate f2 and third pulse-repetition rate f3 are controlled by a phase-locked loop belonging to the second station.

Second series TX200-serP is therein generated by a pulse generator, with the pulse generator being controlled by the phase-locked loop such that second series TX200-serP will have second pulse-repetition rate f2. Third series TX200-serM is furthermore generated by a pulse generator, with the pulse generator being controlled by the phase-locked loop such that third series TX200-serM will have third pulse-repetition rate f3.

First series TX100-ser is moreover initially transmitted by the first station to the second station and received there. Series REC200-ser received at the second station is fed to a correlator belonging to the second station where received series REC200-ser will be correlated with second series TX200-serP or third series TX200-serM. A signal BB200-ser is therein generated which is fed to the phase-locked loop. The phase-locked loop in turn makes second pulse-repetition rate f2 and third pulse-repetition rate f3 available based on signal BB200-sig.

It is also an object to provide an arrangement for determining signal propagation delay τ between a first station in the arrangement and a second station in the arrangement, with the first station having a first pulse generator by which a first series TX100-ser of first signal pulses can be generated at a first pulse-repetition rate f1, the second station having a second and third pulse generator, with it being possible for the second pulse generator to generate a second series TX200-serP of second signal pulses at a second pulse-repetition rate f2 and it being possible for the third pulse generator to generate a third series TX200-serM of third signal pulses at a third pulse-repetition rate f3, with f2=f1+Δf and f3=f1−Δf applying to the pulse-repetition rates, the second station having a transmitting device for transmitting second TX200-serP and third series TX200-serM to the first station, the first station having a receiving device for receiving the transmitted series and a correlator for correlating received series REC100-serP, REC100-serM with first series TX100-ser, with a resultant series BB100-ser being generated during the correlation, and the first station having an evaluation unit by which a time distance Δ between two successive signal pulses of the resultant series BB100-ser can be ascertained.

The second station advantageously includes a switch that is connected to the second and third pulse generator and to the transmitting device. The switch is configured to select second series TX200-serP or third series TX200-serM for transmittal to the first station.

The first station furthermore includes a transmitting device for transmitting first series TX100-ser to the second station. The second station also has a receiving device for receiving transmitted first series TX100-ser, as well as a correlator for correlating received first series REC200-ser with second series TX200-serP or with third series TX200-serM. A signal BB200-ser that can be fed to a phase-locked loop belonging to the second station is generated during the correlation. The phase-locked loop controls the second and third pulse generator based on signal BB200-ser.

An advantage of the invention compared with the prior art is that a bistatic distance-measuring system can be produced from two pulse radars by slightly expanding the PLL circuit and receiving unit. The system is furthermore characterized by its simplicity in signal-processing terms. Fast sampling rates are obviated through successive sampling and a kind of time spreading is produced. Because suitable transmission will give the baseband signal a symmetric curve, distance evaluations are also simplified. Multi-channel reflections with a propagation delay of longer duration will be further apart. The complete PLL circuits can be implemented in a microcontroller. The method in accordance with the invention can thus be applied to different pulse-radar methods, for example, to methods in which successive noise sequences are correlated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Other advantages, features, and specifics of the invention will emerge from the exemplary embodiment described below and with the aid of the drawings, in which:

FIG. 2C shows an alternative embodiment of an arrangement for measuring the propogation delay.

DETAILED DESCRIPTION OF THE PREFERRED EMBODIMENTS

Figure 1B:
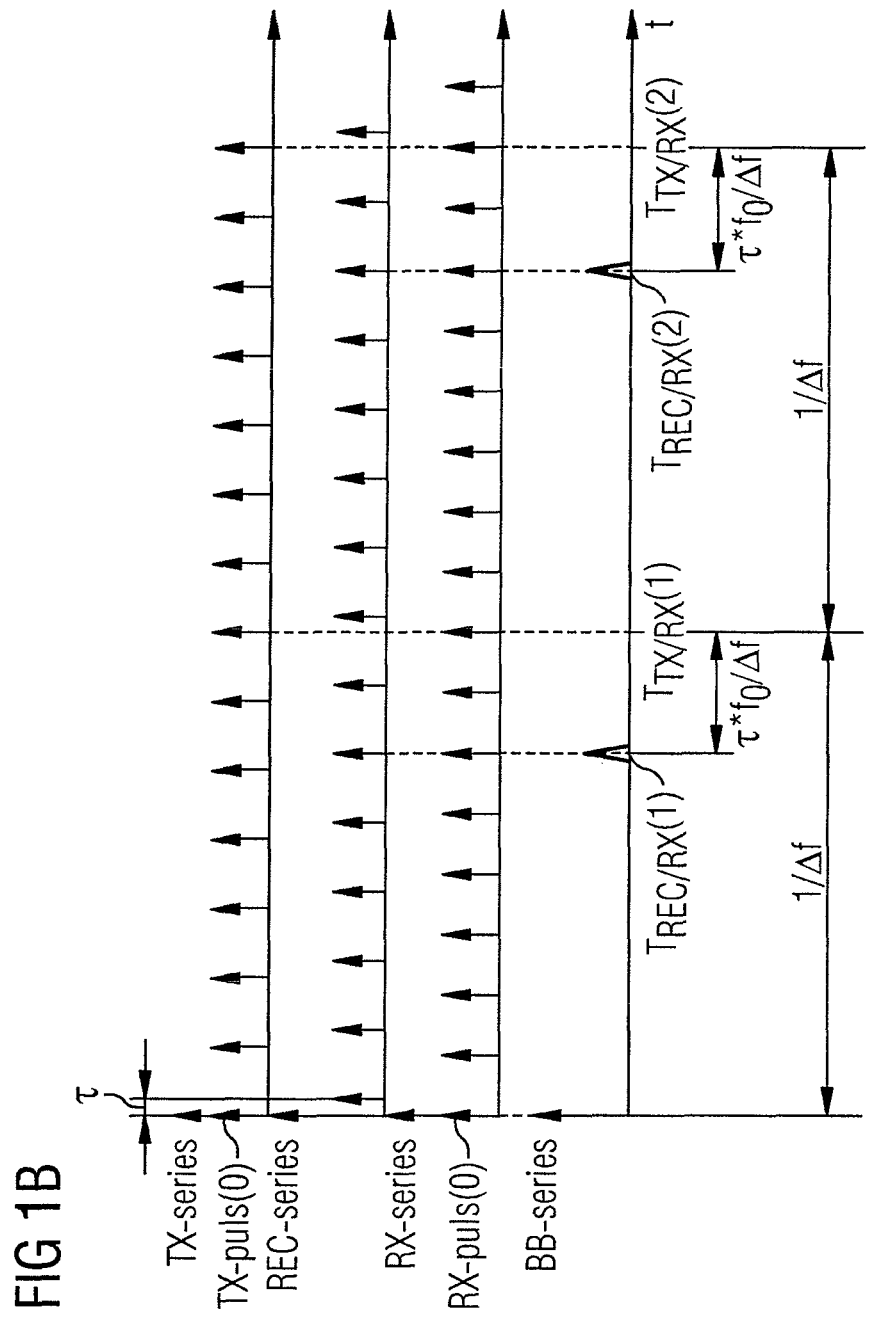
FIGS. 1A, B show a conventional device for measuring a propagation delay in accordance with the prior art, as well as a corresponding graphical plot of a time chart showing the generated pulses.
Figure 2A:
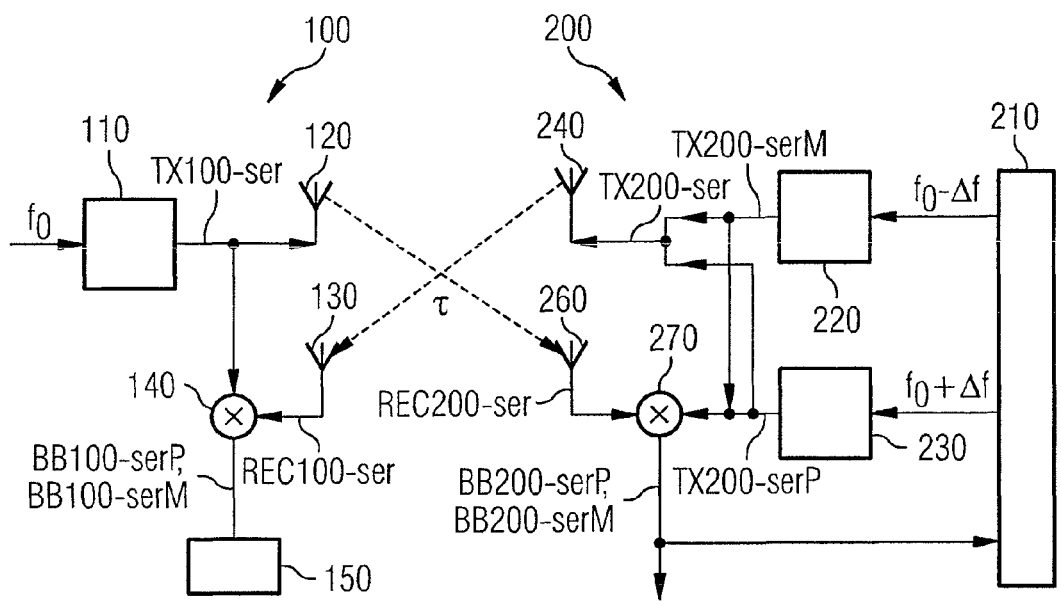
FIGS. 2A, B show an arrangement for measuring the propagation delay between a first and second station in accordance with the invention, as well as a graphical plot of a time chart showing the signal pulses generated in the process.

FIG. 2A is an overview of an arrangement 1 for determining a distance between a first station 100 and a second station 200 in accordance with the invention. First station 100 includes a pulse generator 110 which, in a manner comparable with first pulse generator 11 shown in FIG. 1A, generates a first series TX100-ser of signal pulses TX100-puls(i), where i=0, 1, 2, 3, . . . , at a pulse-repetition rate $f_0$. Series TX100-ser is emitted via an antenna 120 of the first station 100 and received by an antenna 260 of the second station 200 after a propagation delay τ. What will hence be available at antenna 260 of second station 200 is another series REC200-ser of signal pulses which, while corresponding to series TX100-ser, will be time-shifted relative thereto by signal propagation delay τ. In contrast to the conventional method described above in connection with FIGS. 1A, 1B, propagation delay τ is here defined such that τ indicates the length of time a signal takes to travel from first station 100 to second station 200, or from second station 200 to first station 100.

Series TX100-ser is furthermore fed to a mixer 140 belonging to first station 100.

Second station 200 has a PLL 210 which drives a first pulse generator 220 and a second pulse generator 230 belonging to second station 200. First pulse generator 220 thereupon generates a series TX200-serP of signal pulses TX200-pulsP(j), where j=0, 1, 2, 3, . . . , at a pulse-repetition rate $f2=f_0+\Delta f$. Second pulse generator 230 correspondingly generates a series TX200-serM of signal pulses TX200-pulsM(k), where k=0, 1, 2, 3, . . . , at a pulse-repetition rate $f3=f_0-\Delta f$. It is therein essential for series TX200-serP and TX200-serM to be generated having a fixed mutual phase relationship. For example, first pulses TX200-pulsP(0) and TX200-pulsM(0) of the two corresponding series are generated having a specific and known time distance from each other, ideally simultaneously. That means that pulses TX200-pulsP(0) and TX200-pulsM(0) occur simultaneously and, as described below, will also be emitted simultaneously and received at first station 100 simultaneously. Such simultaneity will no longer apply to second pulses TX200-pulsP(1) and TX200-pulsM(1) because of the different pulse-repetition rates of series TX200-serP and TX200-serM.

f2 and f3 must in particular have the same phase angle in second station 200 with reference to f1.

It is of course basically possible not to use two separate pulse generators but merely one pulse generator which, however, must be suitable for generating both series.

Second station 200 synchronizes itself with first station 100 through pulse series REC200-ser, which except for being displaced in time corresponds to pulse series TX100-ser transmitted by first station 100, received from first station 100 first being fed to a correlator 270, such as a mixer. Series TX200-serP generated in the first pulse generator 220 and series TX200-serM generated in the second pulse generator 230 are also fed to correlator 270. Series BB200-serP, BB200-serM are generated in correlator 270, with BB200-serP (or, as the case may be, BB200-serM) having a pulse if a pulse of TX200-serP (or, as the case may be, TX200-serM) coincides in time with a pulse of REC200-ser. PLL 210 is driven by series BB200-serP, BB200-serM that can be obtained from correlator 270 and, based thereon, the PLL in turn controlling the two pulse generators 220, 230 such that they generate the series at the two pulse-repetition rates $f2=f_0+\Delta f$ and $f3=f_0-\Delta f$.

Signal-pulse series TX100-ser emitted by first station 100 is accordingly received in the second station 200 through received signal REC200-ser being fed to a correlator 270 in which it is correlated with the pulse series of second station TX200-serP or, as the case may be, TX200-serM. f2 and f3 are controlled such that series BB200-serP and BB200-serM resulting from correlating will coincide.

Series TX200-serM and TX200-serP generated in pulse generators 220, 230 are fed to the antenna 240 of the second station 200 and emitted by the second station 200. The two series TX200-serM and TX200-serP are in the exemplary embodiment shown in FIG. 2A first mutually superimposed in principle in a simple manner, meaning they are added, for instance, with the aid of the appropriate electronic means with which a person skilled in the relevant art will be familiar. Resulting series TX200-ser, which is then emitted, consists accordingly of a multiplicity of pulses which, do not, however, have a fixed pulse-repetition rate.

Emitted series TX200-ser of second station 200 is received after propagation delay τ by an antenna 130 of first station 100. What will hence be available at antenna 130 is another series REC100-ser of signal pulses REC100-puls(1), where 1=0, 1, 2, 3, . . . , which, while corresponding to series TX200-ser, will be time-shifted relative thereto by signal propagation delay τ. Received series REC100-ser is fed to mixer 140 and correlated there with series TX100-ser of pulse generator 110 belonging to first station 100.

A series BB100-ser having signal pulses BB100-puls(m), where m=0, 1, 2, 3, . . . , will be generated in mixer 140, which series will in each case have a signal pulse BB100-puls(m) if a signal pulse TX100-puls(i) of TX100-ser coincides in time with a signal pulse REC100-puls(1) of REC100-ser.

Series BB100-ser is finally fed to an evaluation unit 150 in which a time distance Δ between two successive signal pulses of resulting series BB100-ser can be ascertained.

FIG. 2B shows the time characteristics of the different pulse series TX100-ser, REC200-ser, TX200-serP, TX200-serM, BB200-ser, REC100-serP, REC100-serM, BB100-serP, and BB100-serM. Noted also in FIG. 2B are the different series' respective pulse-repetition rates. The two individual series TX200-serP and TX200-serM combined into series TX200-ser are therein shown separately from each other.

Also shown accordingly are two individual series REC100-serP and REC100-serM that would be received by antenna 130 were TX200-serP and TX200-serM actually to be transmitted separately. Likewise shown accordingly are series BB100-serP and BB100-serM that would be generated in mixer 140 were TX200-serP and TX200-serM to be transmitted and received separately. For example BB100-serM would proceed from correlating REC100-serM with TX100-ser.

Signal propagation delay τ can be ascertained using signal series BB100-serM and BB100-serP by determining time distance A between a signal pulse BB100-pulsM(n) of series BB100-serM and an ensuing signal pulse BB100-pulsP(o) of series BB100-serP (n,o=0, 1, 2, 3, . . . ), where n=o, for example. $\Delta = 2 \ast i \ast f0/\Delta f$ applies to the time distance, i.e., $\Delta$ is proportional to propagation delay τ and hence proportional to the spatial distance between the first station 100 and the second station 200.

What can basically constitute a possible source of errors in ascertaining the correct propagation delay τ is that, for example, the time distance $\Delta'$ between a pulse BB100-pulsM(n) and a pulse BB100-pulsP(o) is determined with n≠o. The correct distance value from $\Delta$ and $\Delta'$ can, however, readily be selected on account of it being clear from the technical circumstances that only one value can be correct.

Because the time distance between BB100-serM and BB100-serP is proportional to the measured distance or, as the case may be, to propagation delay τ, a clear assignment can be made by limiting the measuring range.

The pulse-repetition rates used for calculating the chart in FIG. 2B do not match the actual conditions. For example, a basic frequency $f_0 = 5$ MHz and a frequency displacement $\Delta f = 50$ Hz would be used for inventive distance or, as the case may be, propagation-delay measuring. Pulses BB100-pulsP(O) and BB100-pulsM(O) would accordingly be closer together in time while pulses BB100-pulsP(O) and BB100-pulsM(1) would be further apart. It would therefore be easy to select the clearly correct pulse distance, i.e., the smaller pulse distance.

FIG. 2C shows an alternative embodiment of the arrangement in which the two series TX200-serP and TX200-serM generated in pulse generators 220, 230 are not fed directly to antenna 240. Here, a switch 250 is used to select which of the two pulse series is emitted at what instant in time. Pulse series TX200-ser emitted by antenna 240 thus corresponds during the period of time between instants $t_0$ and $t_1$ to series TX200-serP and during an ensuing period of time $t_1$ to $t_2$ to the other series TX200-serM. Series TX200-serP is emitted again during the ensuing period of time $t_2$ to $t_3$, etc. The operating mode in the first station 100 and the ascertaining of propagation delay τ are independent thereof and proceed as described in connection with FIGS. 2A and 2B.

Switch 250 is accordingly controlled such that a group of pulses of one series and a group of pulses of the other series, TX200-serM and TX200-serP respectively, will be transmitted alternately. Consequently, for example, a plurality of pulses of series TX200-serM will be emitted first, followed by a plurality of pulses of series TX200-serP, then again a plurality of pulses of series TX200-serM, etc. The number of pulses having to belong to one group is therein established or, as the case may be, selected such that there will be pulse series BB100-serM or else BB100-serP resulting from correlating in the first station 100.

The switch is specifically driven so as to always switch over the instant the pulses of second series TX200-serP and of third series TX200-serM are generated simultaneously. Second series TX200-serP is advantageously transmitted after synchronous correlation signals BB200-serP and BB200-serM generated in mixer 270, and TX200-serM before correlation signals BB200-serP and BB200-serM.

Other methods for emitting series TX200-serM and TX200-serP are of course likewise conceivable. For example, the two series' individual pulses can be emitted alternately via antenna 240 with the aid of a corresponding switch 250 (see FIG. 2C).

Figure 3:
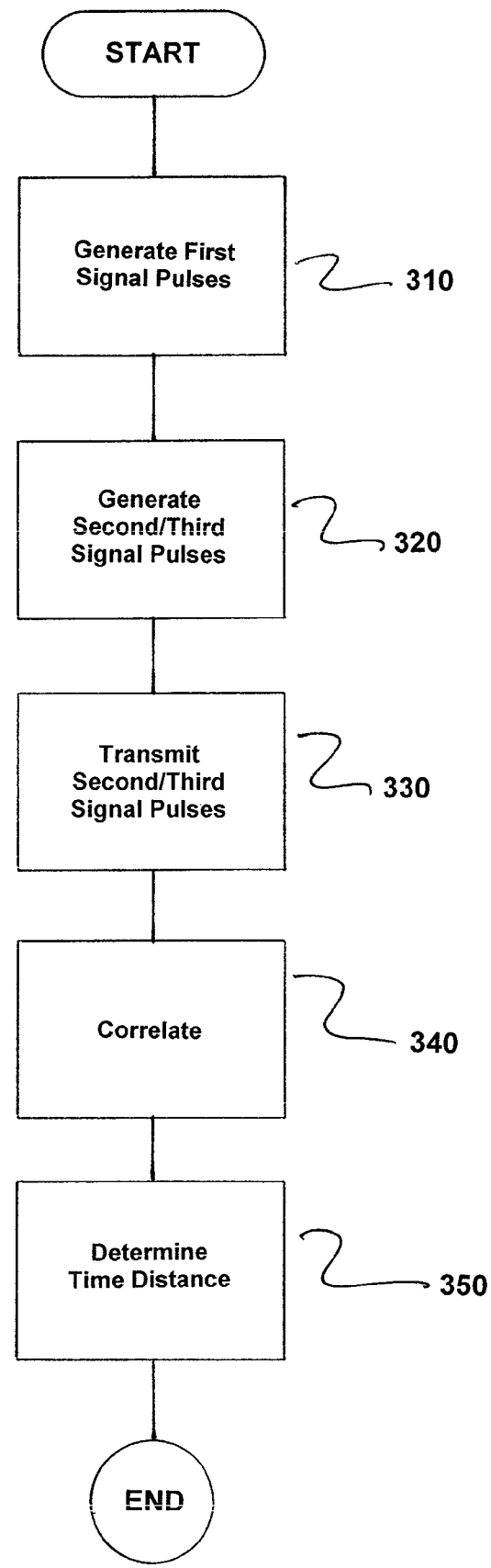
FIG. 3 is a flow chart of the method in accordance with an embodiment of the invention.

FIG. 3 is a flow chart of a method for determining signal propagation delay between a first station (100) and a second station (200). The method comprises generating a first series of first signal pulses in the first station (100) at a first pulse-repetition rate f1, as indicated in step 310.

A second series of second signal pulses is generated in the second station (200) at a second pulse-repetition rate f2 and a third series of third signal pulses is generated in the second station (200) at a third pulse-repetition rate f3, as indicated in step 320. Here, $f2 = f1 + \Delta f$ and $f3 = f1 - \Delta f$ apply to the pulse-repetition rates in the second station.

The second station (200) transmits the second series of second signal pulses and the third series of third signal pulses to the first station (100) for receipt at the first station (100), as indicated in step 330.

The second series of second signal pulses and the third series of third signal pulses received at the first station (100) are fed to a correlator and the second series of second signal pulses and the third series of third signal pulses are correlated in the correlator with the first series of first signal pulses generated in the first station (100) to generate a resultant series of result signal pulses, as indicated in 340.

The signal propagation delay from a time distance $\Delta$ between two successive signal pulses of the resultant series of resultant signal pulses is then determined, as indicated in step 350.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining signal propagation delay between a first station and a second station, comprising:
generating a first series of first signal pulses in the first station at a first pulse-repetition rate f1;
generating a second series of second signal pulses in the second station at a second pulse-repetition rate f2 and generating a third series of third signal pulses in the second station at a third pulse-repetition rate f3, with $f2 = f1 + \Delta f$ and $f3 = f1 - \Delta f$ applying to the pulse-repetition rates in the second station;
transmitting, by the second station, the second series of second signal pulses and the third series of third signal pulses to the first station for receipt at the first station;
feeding the second series of second signal pulses and the third series of third signal pulses received at the first station to a correlator and correlating the second series of second signal pulses and the third series of third signal pulses in the correlator with the first series of first signal pulses generated in the first station to generate a resultant series of result signal pulses; and determining the signal propagation delay from a time distance Δ between two successive signal pulses of the resultant series of resultant signal pulses.

2. The method as claimed in claim 1, wherein a signal pulse of the resultant series of resultant signal pulses is generated in the correlator whenever a signal pulse of the first series of first signal pulses coincides in time with a signal pulse of the received second series of second signal pulses and the third series of third signal pulses.

3. The method as claimed in claim 1, wherein the second series of second signal pulses and the third series of third signal pulses in the second station are first mutually superimposed to form a further series by adding the second and third series; and wherein the second and third series are subsequently transmitted to the first station as a further series of signal pulses and received at the first station.

4. The method as claimed in claim 2, wherein the second series of second signal pulses and the third series of third signal pulses in the second station are first mutually superimposed to form a further series by adding the second and third series; and wherein the second and third series are subsequently transmitted to the first station as a further series of signal pulses and received at the first station.

5. The method as claimed in claim 1, wherein the second series of second signal pulses and the third series of third signal pulses are fed to a switch in the second station before being transmitted to the first station, the switch being controlled to alternately select one of the second series of second signal pulses and the third series of third signal pulses to form a selected series, and the selected series being transmitted to the first station and received by the first station.

6. The method as claimed in claim 2, wherein the second series of second signal pulses and the third series of third signal pulses are fed to a switch in the second station before being transmitted to the first station, the switch being controlled to alternately select one of the second series of second signal pulses and the third series of third signal pulses to form a selected series, and the selected series being transmitted to the first station and received by the first station.

7. The method as claimed in claim 5, wherein the switch is driven to change over at an instant in which the second series of second signal pulses and the third series of third signal pulses are generated simultaneously.

8. The method as claimed, in claim 1, wherein the second series of second signal pulses and third series of third signal pulses are generated with a fixed mutual phase relationship.

9. The method as claimed in claim 1, wherein the second pulse-repetition rate f2 and the third pulse-repetition rate f3 are controlled by a phase-locked loop of the second station.

10. The method as claimed in claim 9, wherein at least one of the second series of second signal pulses is generated by a pulse generator controlled by the phase-locked loop such that the second series has second pulse-repetition rate f1 and the third series of third signal pulses is generated by the pulse generator controlled by the phase-locked loop such that the third series has third pulse-repetition rate f3.

11. The method as claimed in claim 9, wherein the first series of first signal pulses is transmitted by the first station to the second station and received at the second station;

wherein the first series of signal pulses received at the second station is fed to a correlator of the second station at which the received first series of signal pulses is correlated with one of the second series of second pulses signal and the third series of third pulse signals to generate a signal; and wherein the signal is fed to the phase-locked loop and the phase-locked loop subsequently in turn makes the second pulse-repetition rate f2 and third pulse-repetition rate f3 available based on the generated signal.

12. The method as claimed in claim 10, wherein the first series of first signal pulses is transmitted by the first station to the second station and received at the second station;

wherein the first series of signal pulses received at the second station is fed to a correlator of the second station at which the received first series of signal pulses is correlated with one of the second series of second pulses signal and the third series of third pulse signals to generate a signal; and wherein the signal is fed to the phase-locked loop and the phase-locked loop subsequently in turn makes the second pulse-repetition rate f2 and third pulse-repetition rate f3 available based on the generated signal.

13. The method as claimed in claim 1, wherein the a correlator comprises a mixer.

14. An arrangement for determining signal propagation delay τ between a first station in the arrangement and a second station in the arrangement, comprising a first pulse generator arranged in the first station, the first pulse generator generating a first series of first signal pulses at a first pulse-repetition rate f1;

at least one further pulse generator arranged in the second station, the at least one further pulse generator generating a second series of second signal pulses at a second pulse-repetition rate f2 and a third series of third signal pulses at a third pulse-repetition rate f3, with f2=f1+Δf and f3=f1−Δf applying to the pulse-repetition rates;

a second transmitting device arranged in the second station and for transmitting the second series of second pulse signals and the third series of third pulse signals to the first station;

a receiving device and a correlator arranged in the first station, the receiving device receiving the transmitted second series of second pulse signals and the third series of third pulse signals and the correlator correlating the received second series of second pulse signals and the third series of third pulse signals with the first series to generate a resultant series of signal pulses; and an evaluation unit arranged in the first station, the evaluation unit determining a time distance between two successive signal pulses of the resultant series of signal pulses.

15. The arrangement as claimed in claim 14, wherein the second station includes a switch connected to the at least one further pulse generator and to the transmitting device, the switch being configured to select one of the second series of second signal pulses and the third series of third signal pulses for transmittal to the first station.

16. The arrangement as claimed in claim 14, wherein the first station includes a transmitting device for transmitting the first series of first signal pulses to the second station;

wherein the second station includes a receiving device for receiving the transmitted first series of signal pulses and a correlator for correlating the received first series of signal pulses with at least one of the second series of second signal pulses and the third series of third signal pulses, with a signal being generated during the correlation; and wherein the second station includes a phase-locked loop to which the signal generated during the correlation is fed, the phase-locked loop controlling the at least one further pulse generator based on the signal generated during the correlation.

17. The arrangement as claimed in claim 15, wherein the first station includes a transmitting device for transmitting the first series of first signal pulses to the second station
   wherein the second station includes a receiving device for receiving the transmitted first series of signal pulses and a correlator for correlating the received first series of signal pulses with at least one of the second series of second signal pulses and the third series of third signal pulses, with a signal being generated during the correlation; and
   wherein the second station includes a phase-locked loop to which the signal generated during the correlation is fed, the phase-locked loop controlling the at least one further pulse generator based on the signal generated during the correlation.

\* \* \* \* \*